(12) United States Patent
Akatsuka et al.

(10) Patent No.: US 10,501,115 B2
(45) Date of Patent: Dec. 10, 2019

(54) DRIVING SUPPORT DEVICE FOR VEHICLE AND VEHICLE DRIVING SUPPORT METHOD

(71) Applicant: DENSO CORPORATION, Kariya, Aichi-pref. (JP)

(72) Inventors: Hisaya Akatsuka, Kariya (JP); Daiji Watanabe, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 208 days.

(21) Appl. No.: 15/649,344

(22) Filed: Jul. 13, 2017

(65) Prior Publication Data

US 2018/0015947 A1    Jan. 18, 2018

(30) Foreign Application Priority Data

Jul. 15, 2016    (JP) .................................. 2016-140414

(51) Int. Cl.
| | |
|---|---|
| *B62D 6/00* | (2006.01) |
| *B62D 15/02* | (2006.01) |
| *B62D 5/04* | (2006.01) |
| *B62D 6/08* | (2006.01) |
| *B62D 1/28* | (2006.01) |

(52) U.S. Cl.
CPC ............ *B62D 6/002* (2013.01); *B62D 1/286* (2013.01); *B62D 5/0421* (2013.01); *B62D 5/0463* (2013.01); *B62D 5/0466* (2013.01); *B62D 6/008* (2013.01); *B62D 6/08* (2013.01); *B62D 15/025* (2013.01)

(58) Field of Classification Search
USPC ........................................... 701/42
See application file for complete search history.

(56) References Cited

U.S. PATENT DOCUMENTS

| | | | |
|---|---|---|---|
| 2006/0077052 A1 | 4/2006 | Matsuoka | |
| 2007/0250234 A1* | 10/2007 | Ito | B62D 5/0463 |
| | | | 701/41 |
| 2009/0099731 A1 | 4/2009 | Watanabe et al. | |
| 2009/0271074 A1* | 10/2009 | Hulten | B60T 8/1755 |
| | | | 701/42 |

(Continued)

FOREIGN PATENT DOCUMENTS

| | | |
|---|---|---|
| JP | 2014-201258 | 10/2014 |
| JP | 2015-020604 A | 2/2015 |

*Primary Examiner* — Tyler D Paige
(74) *Attorney, Agent, or Firm* — Knobbe, Martens, Olson & Bear, LLP

(57) ABSTRACT

A driving support device for a vehicle includes an assist control unit for generating an assist command for generating an assist torque, a tracking control unit for generating a tracking command for generating an automatic steering torque, an intervention detection unit for detecting an intervention in a tracking process by a steering operation, a tracking limiting unit that limits the tracking process during a detection of the intervention, a steering force correcting unit for generating a correction command for reducing a difference in steering reaction force caused by an operation direction of a driver during the detection of the intervention and a motor driving unit for driving the motor based on the assist command, the tracking command and the correction command.

18 Claims, 11 Drawing Sheets

(56) References Cited

U.S. PATENT DOCUMENTS

| | | | |
|---|---|---|---|
| 2014/0039716 A1* | 2/2014 | Buerkle | B60W 50/0098 701/1 |
| 2015/0217801 A1* | 8/2015 | Takeda | B62D 6/008 701/42 |
| 2015/0246686 A1* | 9/2015 | Takeda | B62D 6/008 701/41 |
| 2015/0246687 A1* | 9/2015 | Takeda | B62D 6/002 701/41 |
| 2015/0274163 A1* | 10/2015 | Terazawa | B60W 10/20 701/41 |
| 2016/0107640 A1* | 4/2016 | Takahashi | B60T 7/12 701/41 |
| 2016/0129933 A1 | 5/2016 | Akatsuka et al. | |
| 2016/0129935 A1 | 5/2016 | Akatsuka et al. | |
| 2016/0152237 A1* | 6/2016 | Takahashi | B60W 30/02 701/41 |
| 2016/0152265 A1* | 6/2016 | Codonesu | B62D 6/002 701/42 |
| 2016/0292998 A1* | 10/2016 | Obuchi | G05D 1/0293 |
| 2017/0137057 A1* | 5/2017 | Kitazume | B62D 5/0466 |
| 2017/0183028 A1* | 6/2017 | Kitazume | B62D 5/0466 |

* cited by examiner

FIG.4A
CONVENTIONAL DEVICE
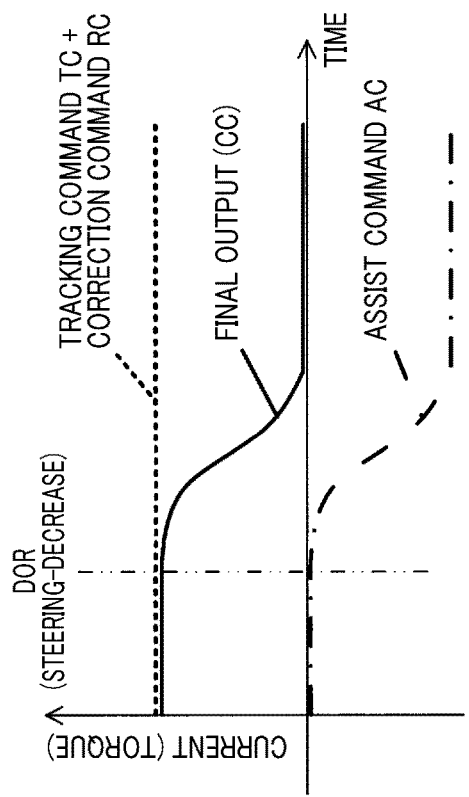
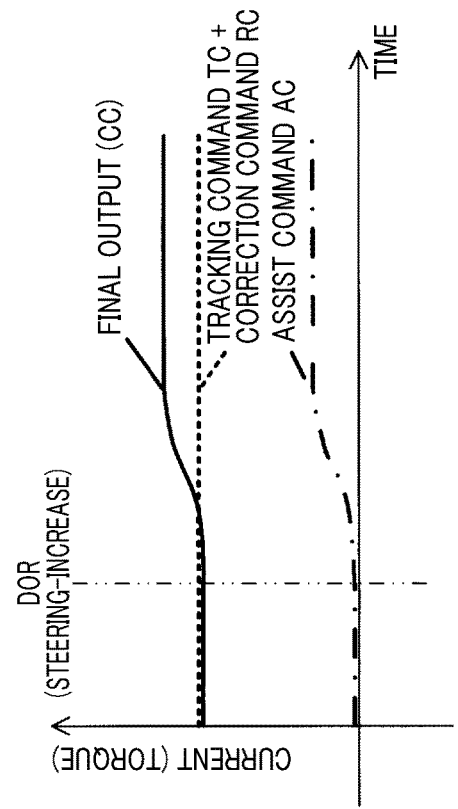
FIG.4B
EMBODIMENT
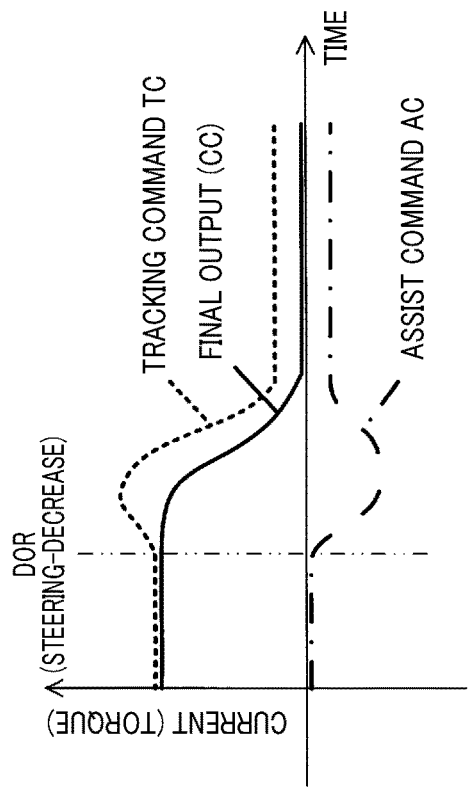
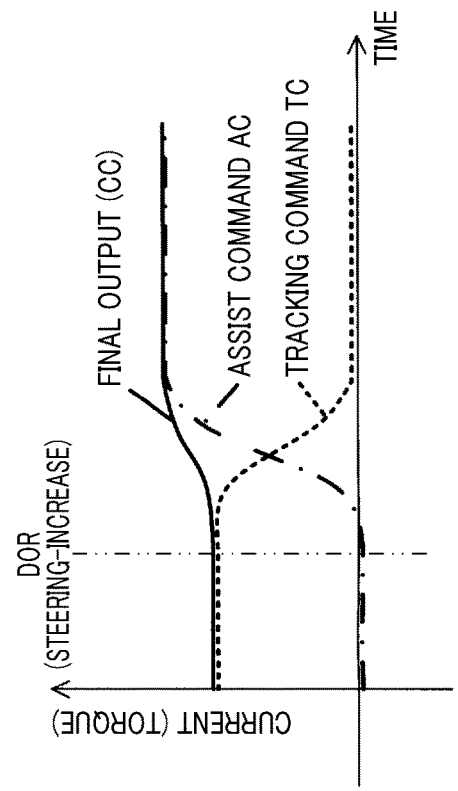

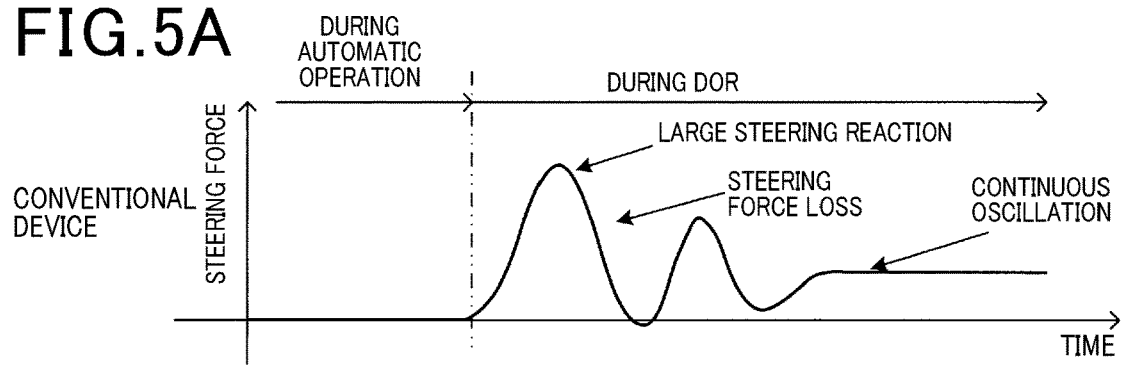
FIG.5A CONVENTIONAL DEVICE
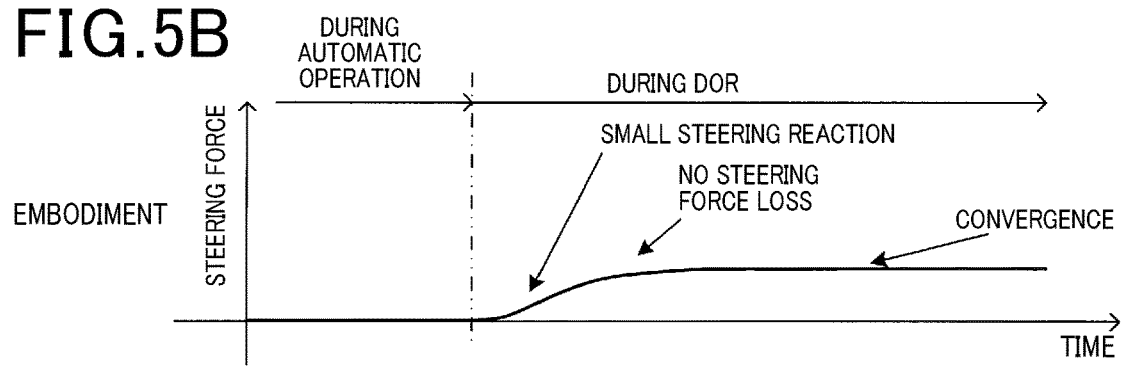
FIG.5B EMBODIMENT
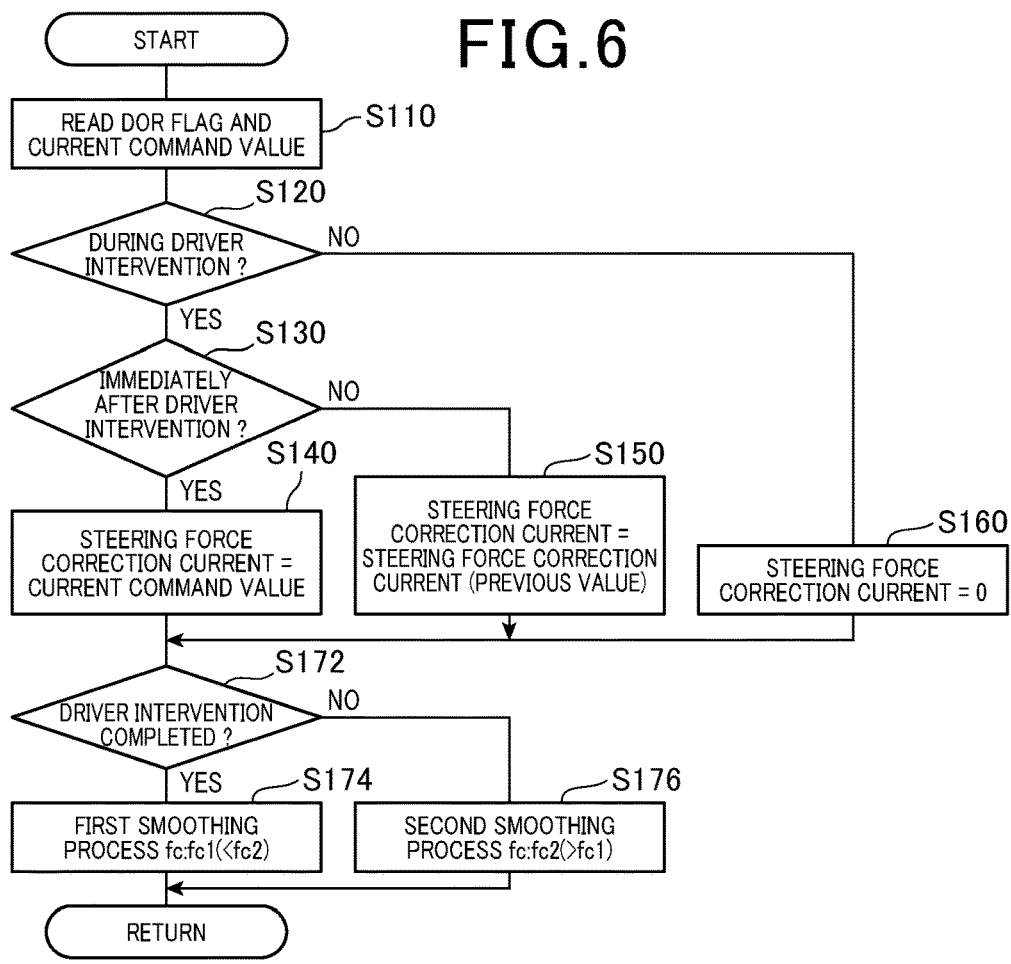
FIG.6

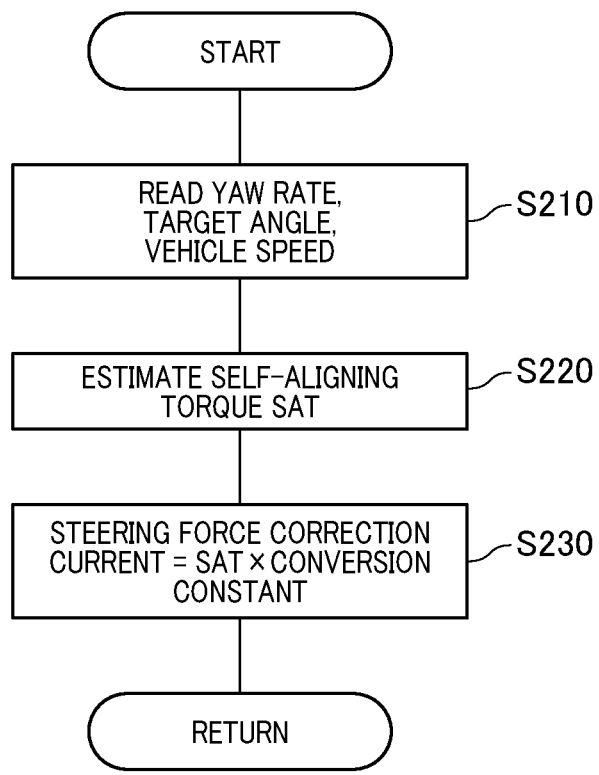

DRIVING SUPPORT DEVICE FOR VEHICLE AND VEHICLE DRIVING SUPPORT METHOD

CROSS-REFERENCE TO RELATED APPLICATION

This application is based on and claims the benefit of priority from earlier Japanese Patent Application No. 2016-140414 filed Jul. 15, 2016, the description of which is incorporated herein by reference.

TECHNICAL FIELD

The present disclosure relates to a driving support device for a vehicle that generates an assist torque and an automatic steering torque by a steering device of a vehicle, and a vehicle driving support method.

BACKGROUND

A device that performs a tracking process that generates an automatic steering torque so that a steering angle of a vehicle becomes a target steering angle by using a power steering device that generates assist torque according to a steering operation of a driver as a driving support device for a vehicle is known.

In addition, in this type of device, while the tracking process is executed, it is proposed that the tracking process is regulated so that the vehicle can be steered according to the steering operation of the driver when the driver performs a so-called driver override steering operation (hereinafter also referred to as DOR) (refer to Japanese Patent Application Laid-Open Publication No. 2015-20604 (Patent Document 1), for example).

According to the proposed device, when the DOR occurs while the tracking process is being executed, a deviation of a steering angle caused by the DOR is canceled by the tracking process, so that the driver cannot steer the vehicle by the steering operation, and discomfort that the driver feels can be suppressed from occurring.

However, in the above proposed device, when the driver performs the steering operation while the wheels are being steered by the tracking process, there may be a difference in a steering reaction force with respect to the steering operation depending on an operation direction.

This is because a self-aligning torque (hereinafter also referred to as SAT) that tries to return the steering angle to 0 is generated when wheels for steering (hereinafter also referred to as steered wheels) are steered to the left or right from the neutral position of the steering angle 0 such as while the vehicle is turning.

That is, when the driver increase turning of the steering wheel in the right direction while the wheels are being steered to the right by the tracking process, for example, since the operation direction is opposite to the SAT, the steering reaction force becomes larger.

In contrast to this, when the driver return the steering wheel position back to the left, since the operation direction becomes the same direction as the SAT, the steering reaction force is reduced and so-called steering force loss occurs.

Therefore, according to the proposed device, when the driver performs the steering operation while the steering wheels are being steered to the left or the right from the reference position by the tracking process, the steering reaction force greatly differs depending on the operation direction, giving the driver a sense of discomfort.

SUMMARY

An embodiment provides a driving support device for a vehicle having a steering device capable of generating a steering reaction force according to an operation amount irrespective of an operation direction when a driver performs a steering operation while the vehicle is steered by an automatic steering torque.

An aspect of a driving support device for a vehicle according to the present disclosure includes an assist control unit, a tracking control unit, an intervention detecting unit, a tracking limiting unit, a steering force correcting unit, and a motor drive unit.

The assist control unit generates an assist command for generating an assist torque for reducing a steering load according to a steering torque generated by a driver's steering operation.

The tracking control unit acquires a target value of a physical quantity related to steering of the vehicle and generates a tracking command for generating an automatic steering torque that causes a detected value of the physical quantity to track the target value.

The intervention detecting unit detects that the driver has intervened in a tracking process by the steering operation, i.e., a driver override (DOR), by the tracking control unit.

The tracking limiting unit limits the tracking process so as to enable the steering of the vehicle by the steering operation by the driver when the DOR is detected by the intervention detecting unit.

In addition, the steering force correcting unit generates a correction command for correcting a steering force so that the difference in the steering reaction force is reduced between a situation where the steering operation by the driver is an steering-increase operation for increasing a steering angle and a situation where the steering operation is a steering-decrease operation for decreasing the steering angle when the intervention detecting unit detects the DOR.

Then, the motor drive unit drives a motor that generates the assist torque and the automatic steering torque based on the assist command, the tracking command, and the correction command.

As described above, according to the driving support device of the present disclosure, since the tracking limiting unit is provided, when the driver performs the steering operation while the tracking control unit is executing the tracking process, the tracking process is limited so that the vehicle can be steered by the steering operation of the driver.

Therefore, according to the driving support device of the present disclosure, when the DOR occurs during the tracking process execution, the driver being unable to steer the vehicle due to a deviation of the steering angle caused by the DOR is canceled can be prevented from occurring.

Further, since the steering force correcting unit is provided in the driving support device according to the present disclosure, when the driver steers the steering wheel while the vehicle is being steered by the tracking process, the steering angle at the start of the operation becomes a center point of the steering operation (so-called neutral point).

Therefore, according to the driving support device of the present disclosure, it is possible to suppress a difference in the steering reaction force depending on the operation direction during the steering operation from occurring, and to restrain the driver from feeling discomfort due to the difference in the steering reaction force.

Further, when a direction of the steering operation by the driver is in the same direction as the SAT, since the steering reaction force disappears and it is possible to suppress a steering force loss from occurring, the operability during the steering operation by the driver can be improved.

BRIEF DESCRIPTION OF THE DRAWINGS

In the accompanying drawings:

FIGS. 4A and 4B show time charts of changes in control outputs by a driver override (DOR) in comparison with a conventional example and the present embodiment;

FIGS. 5A and 5B show time charts of changes of steering forces after a steering-increasing operation in comparison with the conventional example and the present embodiment;

FIG. 6 shows a flowchart of an operation of a steering force correcting unit in a first modification;

FIG. 15 shows a flowchart of an operation of a steering force correcting unit in the eighth modification.

DETAILED DESCRIPTION OF THE PREFERRED EMBODIMENT

Figure 1:
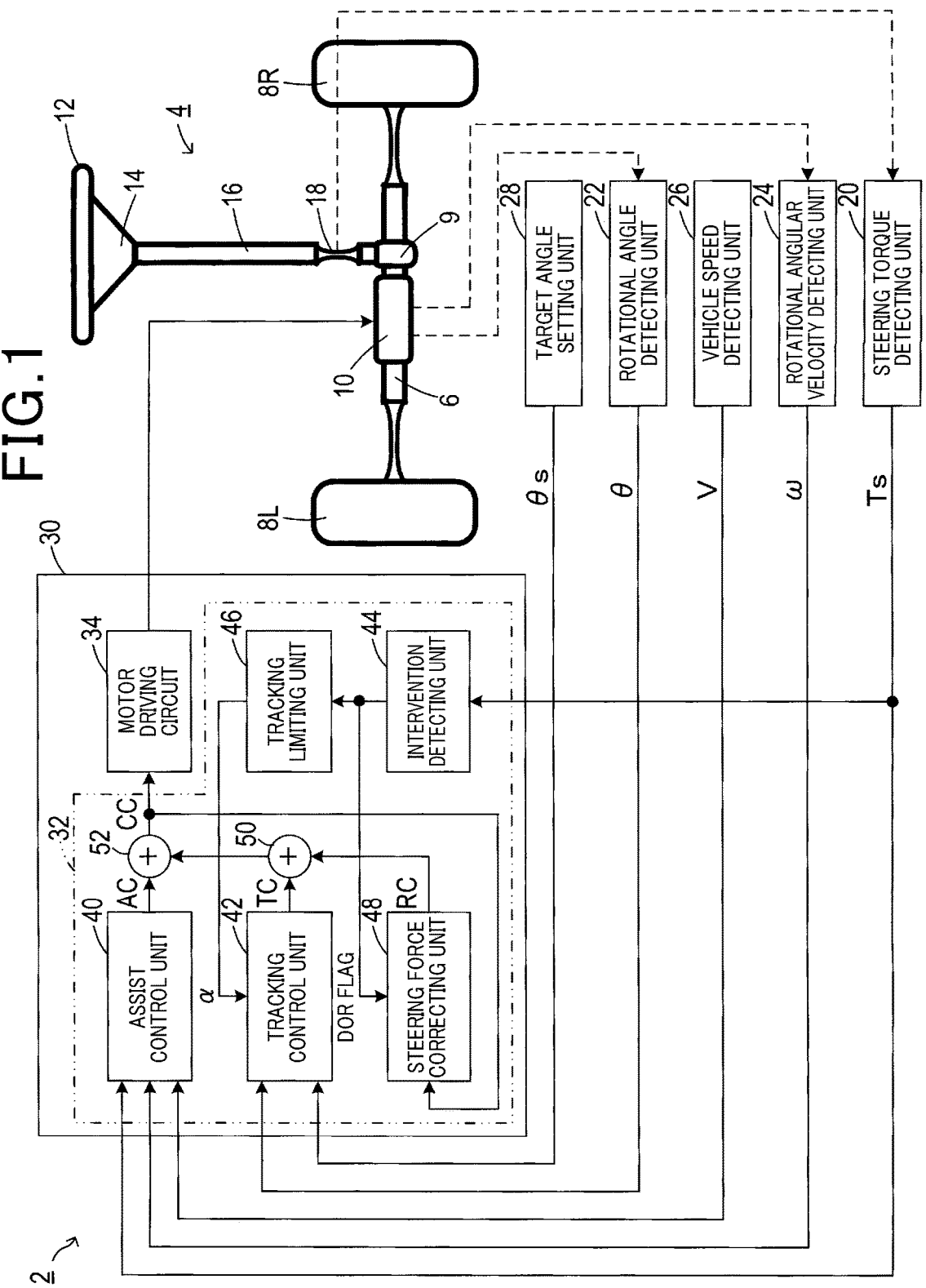
FIG. 1 shows a block diagram of an overall configuration of a driving support device according to an embodiment.

An embodiment of the present invention will be described below with reference to the drawings.

A driving support device 2 according to the present embodiment performs an assist control for assisting a steering operation by a driver and a tracking process for enabling a vehicle to travel automatically (automatic steering) along a traveling lane by using an electric power steering system 4.

The electric power steering system 4 includes a rack 6 for steering the vehicle and a motor 10 for displacing the rack 6 in an axial direction.

The rack 6 is a well-known device that changes a direction (steering angle) of left and right wheels 8L, 8R for steering (generally front wheels, hereinafter also referred to as steered wheels) by being displaced in the axial direction.

The motor 10 is for generating an assist torque based on an assist control and an automatic steering torque based on a tracking process, and a rotating shaft thereof is engaged with the rack 6 via a speed reducer and a pinion gear (neither shown).

Therefore, it is possible to displace the rack 6 in the axial direction by a rotation of the motor 10 and generates torque for steering the vehicle.

In addition to the pinion gear driven and rotated by the motor 10, the rack 6 is connected to a pinion gear 9 that is rotated by the steering operation of the driver.

The pinion gear 9 is connected to a steering wheel 12 operated (steering operation) by the driver via a steering column 14, an intermediate shaft 16, and a torsion bar 18.

Therefore, the rack 6 can be displaced in the axial direction also by the steering operation of the driver.

Next, the torsion bar 18 is provided with a steering torque detecting unit 20 for detecting a steering torque Ts generated by the steering operation of the driver from an amount of twist of the torsion bar 18.

Further, the motor 10 is provided with a rotational angle detecting unit 22 for detecting a rotational angle $\theta$ (in other words, a rotational position) of the motor 10 corresponding to the steering angle of the steered wheels 8L and 8R, and a rotational angular velocity detecting unit 24 for detecting a rotational angular velocity $\omega$ of the motor 10.

Further, the vehicle is provided with a vehicle speed detecting unit 26 for detecting the vehicle speed V which is its traveling speed, and a target angle setting unit 28 for setting a target angle $\theta$s for travelling the vehicle automatically along the traveling lane.

In the present embodiment, the target angle setting unit 28 is constituted by an LKP-ECU which is an electronic control unit for a lane keeping process.

The LKP-ECU detects the traveling lane or a position of the own vehicle in the traveling lane from an image ahead of the vehicle imaged by an in-vehicle camera and sets a target course based on a detection result.

Then, the LKP-ECU sets the target angle $\theta$s which is a target value of the rotational angle $\theta$ for enabling the vehicle to travel along the target course based on detected values of the vehicle speed V and the rotational angle $\theta$ of the motor 10.

Since a procedure for setting the target angle $\theta$s in this manner is well known in the lane keep control, explanation thereof will be omitted here.

Next, the steering torque detecting unit 20, the rotational angle detecting unit 22, the rotational angular velocity detecting unit 24, the vehicle speed detecting unit 26, and the target angle setting unit 28 are connected to an EPS-ECU 30 that is an electronic control unit for the electric power steering.

The EPS-ECU 30 is operated by receiving electric power supplied from an in-vehicle battery (not shown), and drives and controls the motor 10 based on the steering torque Ts, the rotational angle $\theta$, the rotational angular velocity $\omega$, the vehicle speed V, and the target angle $\theta$s detected or set by the respective units.

That is, the EPS-ECU 30 includes a computing unit 32 configured by a microcomputer including a CPU, a ROM, a RAM, and the like, and a motor driving circuit 34 as a motor driving unit.

By executing a control program stored in the ROM by the CPU, the computing unit 32 functions as an assist control unit 40, a tracking control unit 42, an intervention detecting unit 44, a tracking limiting unit 46, a steering force correcting unit 48, and first and second adding units 50 and 52 shown in FIG. 1.

Then, a current command value CC calculated by the second adding unit 52 is inputted to the motor driving circuit 34.

The motor driving circuit 34 generates the assist torque and the automatic steering torque in a steering system (specifically the rack 6) of the vehicle by controlling an energization of the motor 10 so that an actual current value flowing through the motor 10 becomes a target current value, which is the current command value CC from the second adding unit 52.

It should be noted that in order to secure responsiveness necessary for the tracking process (the lane keep control), the computing unit 32 executes the control program at a predetermined cycle (for example, several hundreds of microseconds to several hundreds of milliseconds), and updates the current command value CC in this cycle.

However, it is not always necessary to enable the above-mentioned units enabled by the computing unit 32 using software, and at least a part of these units may be enabled by hardware such as a logic circuit or the like.

Here, the assist control unit 40 generates an assist command AC for generating the assist torque so as to enable a transmission feeling corresponding to a road surface reaction force (road surface load) and a feeling corresponding to a steering state based on the steering torque Ts, the motor rotational angular velocity ω, and the vehicle speed V.

More specifically, the assist control unit 40 calculates a basic assist amount for obtaining the transmission feeling corresponding to the road surface reaction force based on the steering torque Ts and the vehicle speed V, and calculates an assist compensation amount corresponding to the steering state corresponding to the steering torque Ts and the rotational angular velocity ω, for example.

Then, the assist command AC is generated by adding the assist compensation amount multiplied by a gain corresponding to the vehicle speed V to the basic assist amount.

It should be noted that although the assist command AC is a current command value for generating the assist torque by energizing the motor 10, a calculation method is not limited thereto, and any known method can be used.

Next, the intervention detecting unit 44 is for detecting the driver intervening in the tracking process by the steering operation during execution of the tracking process by the tracking control unit 42 (hereinafter also referred to as a driver intervention), and when the intervention is detected, a DOR flag is set. It should be noted that the DOR flag is cleared when no driver intervention is detected.

Specifically, for example, the intervention detecting unit 44 reads the steering torque Ts from the steering torque detecting unit 20, determines that the driver intervention has occurred when the steering torque Ts exceeds the threshold value, and sets the DOR flag.

Further, the tracking limiting unit 46 calculates an intervention coefficient α representing a degree of a driver intervention based on the steering torque Ts when the DOR flag is set (in other words, at driver intervention), and by inputting the intervention coefficient α to the tracking control unit 42, the tracking process by the tracking control unit 42 is limited.

It should be noted that for a calculation of the intervention coefficient α, similar to that described in Patent Document 1, for example, the intervention coefficient α becomes 1 when the steering torque Ts is less than a threshold value, and when the steering torque Ts is equal to or larger than the threshold value, a conversion table set so that the intervention coefficient α decreases as the steering torque Ts is larger is used.

However, this calculation method is not limited thereto, and arbitrary methods such as other methods described in Patent Document 1 can be used.

Next, the tracking control unit 42 generates a tracking command TC based on the target angle θs and a motor rotational angle (hereinafter also referred to as an actual angle) θ. The tracking command TC is a current command value for generating the automatic steering torque necessary for causing the actual angle θ to track the target angle θs.

Further, when generating the tracking command TC, the tracking control unit 42 limits an upper limit of the tracking command TC to a rated current or less of the motor 10.

Then, by multiplying the rated current by the intervention coefficient α set by the tracking limiting unit 46, the upper limit of the tracking command TC during the driver intervention is limited to a current value lower than the rated current in the present embodiment.

As a result, when the driver intervenes in the tracking process by steering operation (during driver intervention) during the execution of the tracking process by the tracking control unit 42, the tracking command TC from the tracking control unit 42 is limited according to a degree of the intervention.

Therefore, even if the tracking process is performed by the tracking control unit 42, the driver can perform the steering operation to steering-increase or steering-decrease the steering wheels 8L, 8R by using the assist torque controlled by the assist control unit 40.

It should be noted that the configuration of the tracking control unit 42 that limits the tracking command TC by using the intervention coefficient α is described in detail in Patent Document 1, so a detailed description thereof will be omitted here.

Figure 2:
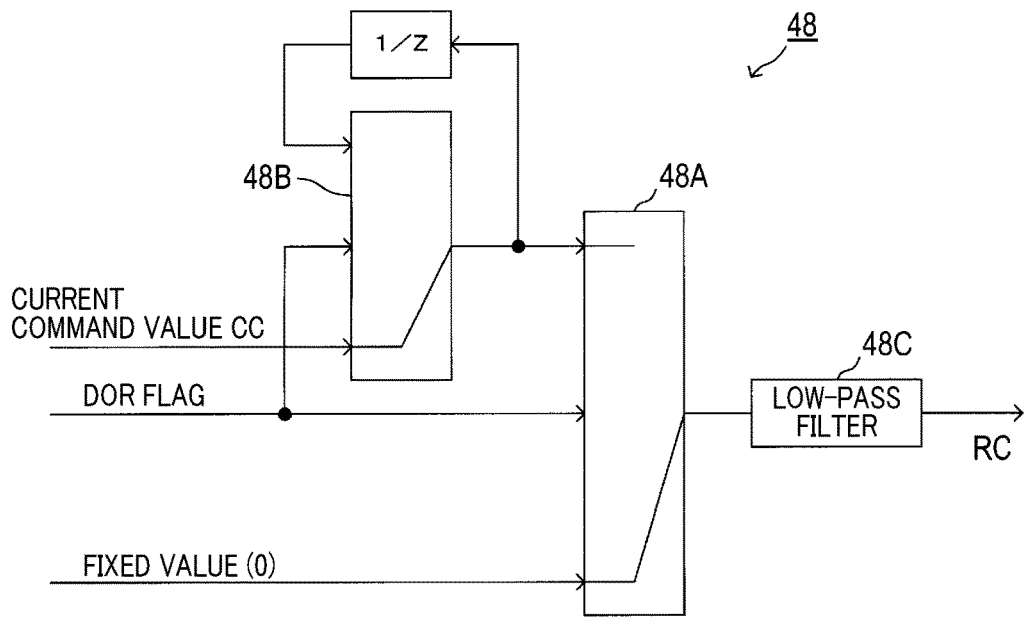
FIG. 2 shows a block diagram of a configuration of a steering force correcting unit.

Next, when a steering angle when the driver intervention is detected by the intervention detecting unit 44 is set as a center point, the steering force correcting unit 48 is for enabling the driver to operate the steering wheel 12 to the left and right with substantially the same steering force from the center point, and is configured as shown in FIG. 2, for example.

That is, as shown in FIG. 2, when the driver intervention is not detected by the intervention detecting unit 44 (DOR flag: cleared), the steering force correcting unit 48 selects a fixed value (value 0) in a first selector 48A and outputs it as a correction command RC representing a corrected current value.

It should be noted that the fixed value (value 0) is a value that does not correct the tracking command TC and the assist command AC.

In addition, the steering force correcting unit 48 includes a second selector 48B that takes in and outputs the current command value CC inputted to the motor driving circuit 34.

When the DOR flag is cleared, the second selector 48B outputs the current command value CC to the first selector 48A.

Further, when the DOR flag is set, the second selector 48B outputs the previous value of the current command value CC to the first selector 48A.

Therefore, the current command value outputted from the second selector 48B when the DOR flag is set becomes a current command value when the driver intervenes in the tracking process by the steering operation.

Then, when the DOR flag is set, the first selector 48A selects an output from the second selector 48B (that is, the current command value at the time of the driver intervention) instead of the fixed value (value 0) and outputs the current command value as a correction command RC representing a correction current value.

Further, the correction command RC is outputted to the first adding unit 50 via a low-pass filter 48C for smoothing the correction current value.

Figure 3:
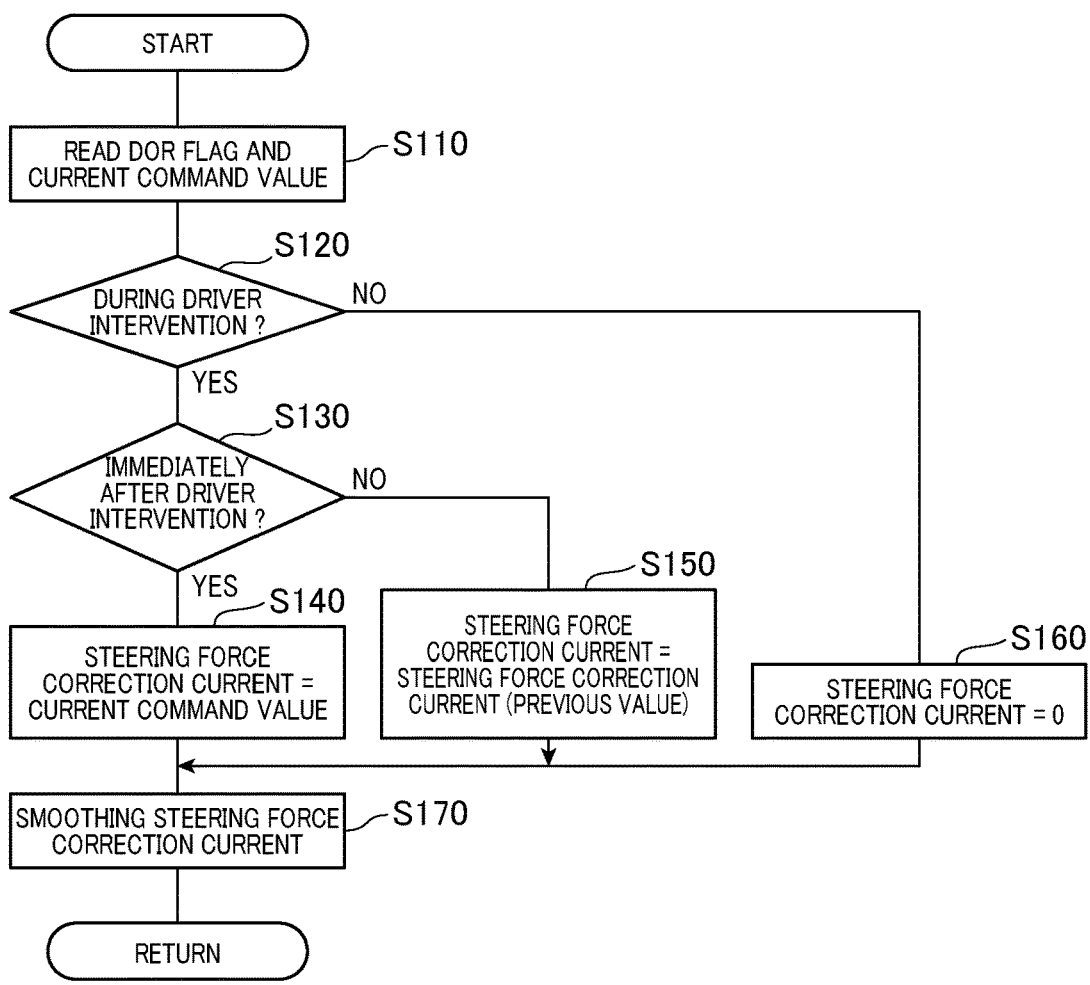
FIG. 3 shows a flowchart of an operation of the steering force correcting unit.

It should be noted that FIG. 2 is a block diagram showing a functional configuration of the steering force correcting unit 48, and functions of the steering force correcting unit 48 are enabled by the CPU executing a steering force correcting process shown in FIG. 3.

The first adding unit 50 corrects the current command value for the tracking process outputted from the tracking control unit 42 by the correction current value from the force correcting unit 48 by adding the correction command RC from the steering force correcting unit 48 and the tracking command TC from the tracking control unit 42.

Further, the second adding unit 52 calculates the current command value CC for driving the motor 10 by adding the outputs (TC+RC) from the first adding unit 50 and the assist command AC from the assist control unit 40, and outputs the current command value CC to the motor driving circuit 34.

Next, the steering force correcting process executed by the computing unit 32 (more specifically, the CPU) to enable the function of the steering force correcting unit 48 shown in FIG. 2 will be described with reference to the flowchart of FIG. 3.

It should be noted that the steering force correcting process is a process executed repeatedly as one of the main routines in the computing unit 32 (more specifically, the CPU).

As shown in FIG. 3, in the steering force correcting process, the DOR flag and the current command value CC to the motor driving circuit 34 are read in S110 (S represents a step).

Next, in S120, it is determined whether or not the driver is presently intervening in the tracking process by ae steering operation, that is, it is determined whether or not driver intervention is occurring by determining whether or not the DOR flag read in S110 is set.

If it is determined in S120 that the driver is not intervening, the process proceeds to S160, in which a value 0 is set as the steering force correction current, and the process proceeds to S170.

On the other hand, if it is determined in S120 that the driver is presently intervening, the process proceeds to S130, where it is determined whether or not it is immediately after the driver has started the steering operation, that is, it is determined whether or not it is immediately after the driver intervention.

If it is determined that the driver intervention has just been performed in S130, the process proceeds to S140, in which the current command value CC read in S110 is set as the steering force correction current, and the process proceeds to S170.

On the other hand, if it is determined that it is not immediately after the driver intervention in S130, the previously set steering force correction current is set as the steering force correction current as it is in S150, and the process proceeds to S170.

Then, by performing an averaging of the steering force correction current set as described above, for example, a process as the low pass filter 48C for smoothing the steering force correction current is executed in S170, and the steering force correcting process is terminated.

It should be noted that the steering force correction current smoothed in S170 is the above corrected current value, and is used as the correction command RC for correcting the tracking command TC in the first adding unit 50.

As described above, according to the driving support device 2 of the present embodiment, when the driver intervenes the tracking process by operating the steering wheel during the execution of the tracking process by the tracking control unit 42, the tracking command TC is limited by setting the intervention coefficient α according to the degree of the intervention by the tracking limiting unit 46.

Therefore, even when the tracking process is executed by the tracking control unit 42, the driver limits the tracking process by the steering operation, and the vehicle can be steered based on the steering operation and the assist command AC from the assist control unit 40.

Incidentally, when the vehicle is being steered to the left or to the right by the tracking process of the tracking control unit 42, such as when the vehicle is turning, a self-aligning torque (SAT) is applied to the rack 6 from the steered wheels 8L, 8R.

For this reason, when the steering operation is performed by the driver and the steering angle is increased or the steering angle is decreased, the steering reaction force applied to the steering wheel 12 is greatly different in a conventional device not provided with the steering force correcting unit 48, as shown in FIG. 4A.

In other words, as shown in FIG. 4A, when the steering angle of the steered wheels 8L, 8R is decreased to 0 degree, the driver performs a steering operation so that the torque applied to the rack 6 from the motor 10 becomes a reference value (0).

In this case, although an output (tracking command TC) of the tracking control unit 42 temporarily increases, it is limited according to the degree of the driver intervention, and then gradually decreases.

Further, in this case, since the operation direction of the driver's steering wheel 12 is the same direction as the SAT, the steering reaction force against the steering operation of the driver becomes small.

Therefore, when the driver steers the steering wheel to decrease the steering angle while the vehicle is being steered by the tracking process, the driver can operate the steering operation with a small steering torque Ts as apparent from the change in the assist command AC.

In contrast to this, when the driver performs the steering operation to increase the steering angle, the driver needs to operate the steering wheel 12 in the direction opposite to the SAT, so that the steering torque Ts required for the steering operation becomes large.

In addition, as the steering torque Ts increases, the intervention coefficient α from the tracking limiting unit 46 becomes an extremely small value close to 0 (zero), and the output from the tracking control unit 42 is limited.

Therefore, when increasing the steering angle, the driver needs to generate a torque that is obtained by adding the torque required for the steering angle and the SAT that occurred before the start of the steering operation by the steering operation and the assist control associated therewith.

Therefore, in order to increase the steering angle during the tracking process, the driver needs to generate a steering torque Ts which is extremely large as compared with a case where the steering angle is decreased by the steering operation.

In contrast to this, in the present embodiment, when the driver intervention (DOR) occurs when the tracking process is executed by the tracking control unit 42, the current command value CC at that time is set as the correction command RC and added to the output from the tracking control unit 42, as shown in FIG. 4B.

Therefore, when the steering operation is performed during executing the tracking process, the driver receives the steering reaction force corresponding to the operation amount of the steering wheel 12 with the steering angle at the driver intervention as the center point (neutral point) even when the operation direction is the left direction or the right direction.

Therefore, in the present embodiment, when steering operation is performed during the tracking process by the driver, and when the steering angle is decreased or increased similarly to the conventional case shown in FIG. 4A, compared to the conventional case, it is possible to increase the steering reaction force when the steering angle is decreased, and it is possible to reduce the steering reaction force when the steering angle is increased.

Therefore, according to the present embodiment, when the driver performs the steering operation during the tracking process, it is possible to restrain the driver from feeling discomfort due to the steering reaction force being greatly varied depending on the operation direction.

In addition, when the driver increases the steering angle by the steering operation during the automatic operation of the vehicle by the tracking process, for example, since the steering reaction force increases in the conventional case, the driver may turn up the steering force at the start of the steering operation too much, thus the steering angle may be increased too much.

In this case, the driver performs the steering operation to return the steering angle, however, when the steering operation is returned, so-called steering force loss occurs due to the SAT, and the steering force becomes 0 so that the steering angle may be reduced too much.

Therefore, according to the conventional device, when the steering angle is increased during the tracking process, the time required for the steering angle to stabilize at the desired angle becomes long, as shown in FIG. 5A, and during that time, the steering force required to maintain the steering angle fluctuates greatly, and thus the operability may decrease.

In contrast to this, in the present embodiment, the steering reaction force when the steering angle is increased can be reduced, as shown in FIG. 5B, so that the driver can quickly converge the steering angle to the desired angle without occurring steering force loss which causes steering force fluctuation.

Therefore, according to the present embodiment, it is possible to improve the operability when the driver performs the steering operation during the tracking process.

Further, when the driver intervention (DOR) is detected by the intervention detecting unit 44, the steering force correcting unit 48 sets the current command value CC (in other words, an addition value by the second adding unit 52) as the correction command RC, and thereafter, the correction command RC is maintained until no intervention is detected.

Furthermore, when the intervention is no longer detected by the intervention detecting unit 44, the correction command RC is returned to the value 0, so that the torque correction is not performed.

Therefore, when the driver performs the steering operation while the vehicle is being automatically driven at the predetermined steering angle by the tracking process, it is possible not only to suppress a difference in the steering reaction force depending on the operation direction from occurring, but also it is possible to promptly shift to the tracking process after finishing the steering operation.

Particularly, in the present embodiment, the correction command RC is not simply switched between when the tracking process is intervened and when it is not intervened by the driver, but at the time of switching, the correction current value is smoothed by the low pass filter.

As a result, when the correction command RC is set to a predetermined value corresponding to the current command value CC or the value 0, the correction command RC gradually changes to a final value that has been set.

Therefore, according to the present embodiment, it is also possible to prevent the driver from feeling discomfort due to the suddenly change of the current command value CC (and hence the steering angle of the vehicle) by the steering operation of the driver.

Although one embodiment of the present disclosure has been described above, the present disclosure is not limited to the above embodiment, and various modifications can be made.

Next, modifications of the above embodiment will be described.

First Modification

Although the steering force correcting unit 48 smoothes the correction command RC in the smoothing process (S170) as the low-pass filter 48C in the above embodiment, this smoothing process may be performed in S172 to S176 shown in FIG. 6.

That is, when the steering force correction current is set in S140 to S160, it is determined in S172 whether or not the driver intervention by the steering operation has been completed based on the DOR flag in the steering force correcting process shown in FIG. 6.

Then, if the driver intervention has been completed (that is, if the driver intervention is not being performed), the process proceeds to S174 to execute a first smoothing process as the low pass filter 48C to smooth the steering force correction current.

On the other hand, if the driver intervention has not been completed (that is, if the driver intervention is in progress), the process proceeds to S176 to execute a second smoothing process as the low pass filter 48C to smooth the steering force correction current.

Here, a cutoff frequency fc which is a smoothing frequency in the first smoothing process executed in S174 is set to fc1 lower than a cutoff frequency fc (=fc2) in the second smoothing process executed in S176.

As a result, a time constant of the low pass filter 48C becomes large when the driver's intervention state is switched from intervention (during DOR) to non-intervention (during automatic operation) as compared with a situation when the driver's intervention state is switched from non-intervention to intervention, and the degree of smoothing increases.

Figure 7:
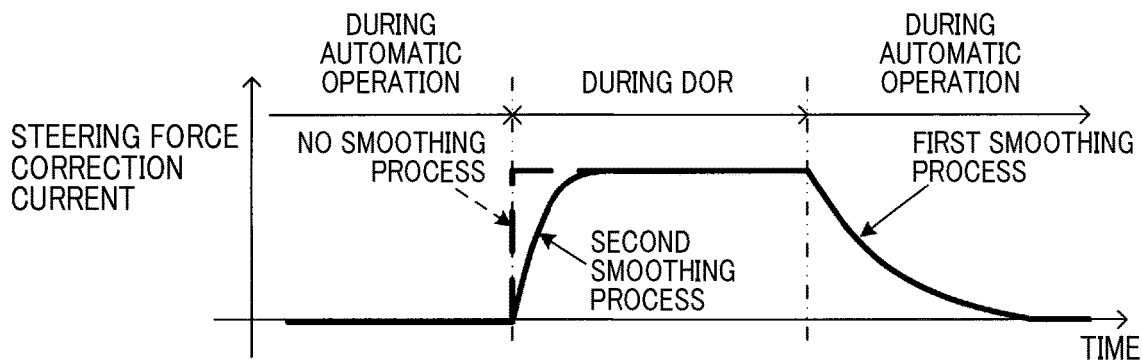
FIG. 7 shows a time chart of a change of a steering force correction current generated by the steering force correcting unit in the first modification.

Therefore, in the first modification, when the vehicle is switched from the automatic operation to the DOR, the steering force correction current (that is, the correction command RC) rapidly reaches the current command value CC at the time of the intervention being detected, as shown in FIG. 7.

Conversely, when the vehicle is switched from the DOR to the automatic operation, the steering force correction current (that is, the correction command RC) slowly changes to the value 0.

Therefore, according to the first modification, it takes time until the correction command RC reaches the current command value CC at the time of the driver intervention after the driver intervention is detected, and the difference of the steering reaction force caused by the direction of the steering operation of the driver can be suppressed from not being insufficiently reduced.

Further, when the driver intervention is no longer detected and the correction command RC is returned to the value 0 which does not correct the current command value CC, the driver can be suppressed from being given a discomfort due to the change of the current command value CC (and hence the steering angle of the vehicle) by changing the correction command RC slowly.

It should be noted that in order to make this effect more effective, the cutoff frequency fc2 at the time of the driver intervention is set to a higher frequency than a response frequency of the tracking process, and the cutoff frequency fc1 at the time of no driver intervention is set to a lower frequency than the response frequency of the tracking process.

Second Modification

It is described in the above embodiment and the first modification that the steering force correcting unit 48 necessarily executes the smoothing process as the low-pass filter 48C, the first smoothing process, or the second smoothing process in the steering force correcting process.

However, in order to quickly switch the correction command RC to the current command value CC at the time of the driver intervention, the smoothing process as the low-pass filter 48C may not be performed after the driver intervention has been detected.

Figure 8:
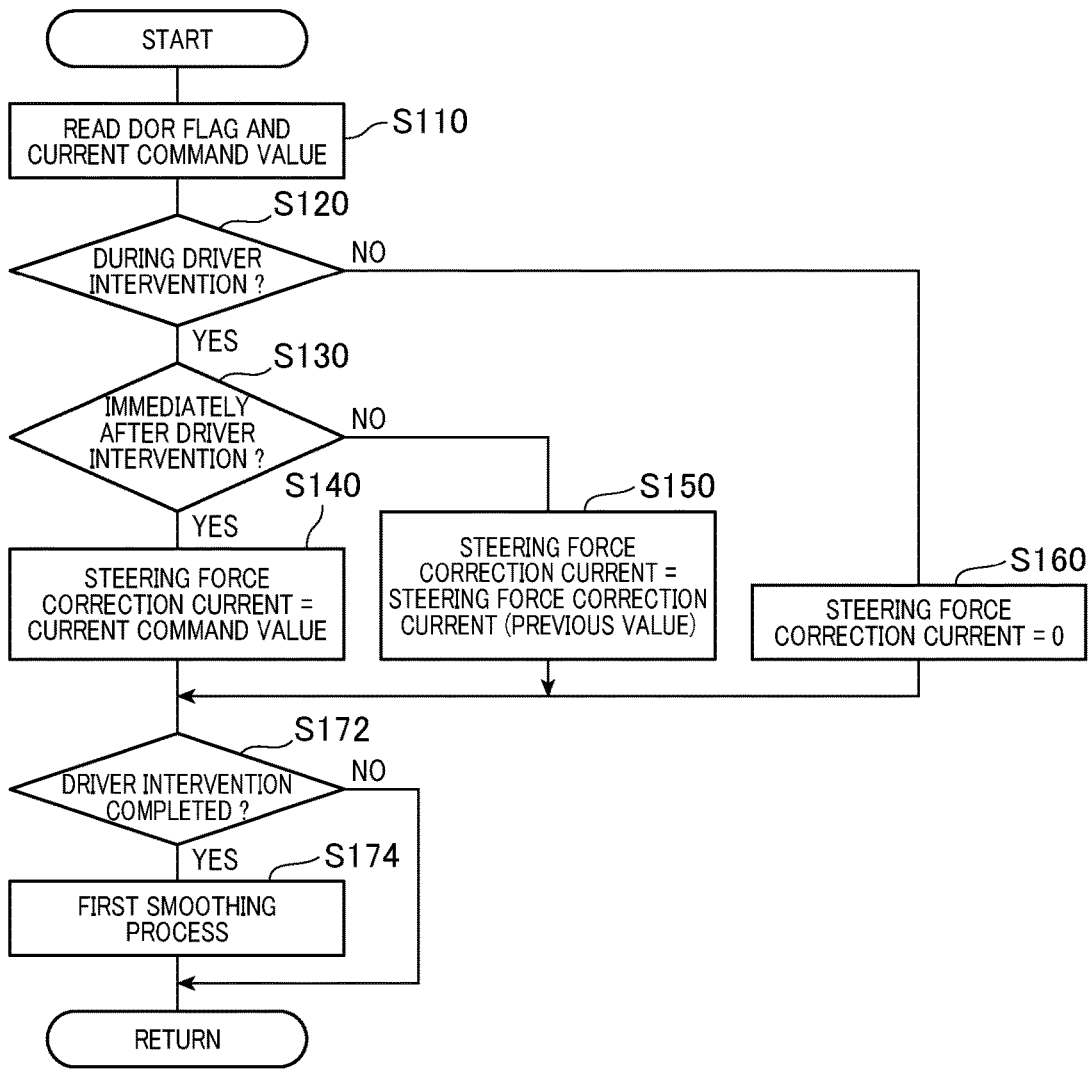
FIG. 8 shows a flowchart of an operation of a steering force correcting unit in a second modification.

That is, in the second modification, as illustrated in FIG. 8, when it is determined that the driver intervention is completed in S172, the first smoothing process in S174 is executed in the steering force correcting process, and otherwise, the process is terminated without executing the second smoothing process.

As a result, as shown by a dashed line in FIG. 7, when the intervention state of the driver with respect to the tracking process is switched from the non-intervention (during automatic operation) to the intervention (during DOR), the steering force correction current (that is, the correction command RC) is quickly switched to the current command value CC at the time of the driver intervention.

Therefore, according to the second modification, it is possible to reliably reduce the difference in the steering reaction force caused by the direction of the steering operation of the driver at the time of the driver intervention.

It should be noted that in the above embodiment and the first and second modifications, the steering force correction current (that is, the correction command RC) is set to a fixed value (value 0) unless the driver intervention is in progress.

However, since the correction command RC is for suppressing a difference in the steering reaction force depending on the operation direction from occurring when the driver performs the steering operation during execution of the tracking process, it is not necessarily that the fixed value (Value 0) need not be returned.

Therefore, the steering force correcting unit 48 may simply execute the processes of S110, S130, S140, S150 in FIGS. 3, 6, and 8 in the steering force correcting process.

Even in this case, when the intervention state of the driver with respect to the tracking process is switched from the intervention (during DOR) to the non-intervention (during automatic operation), since the steering angle is controlled by the tracking process, the vehicle may travel automatically.

Third Modification

Next, when it is determined in S130 that the present moment is not immediately after the driver intervention, it is configured in S150 to maintain the steering force correction current set immediately after the driver intervention in the above embodiment, and the first and second modifications.

Figure 9:
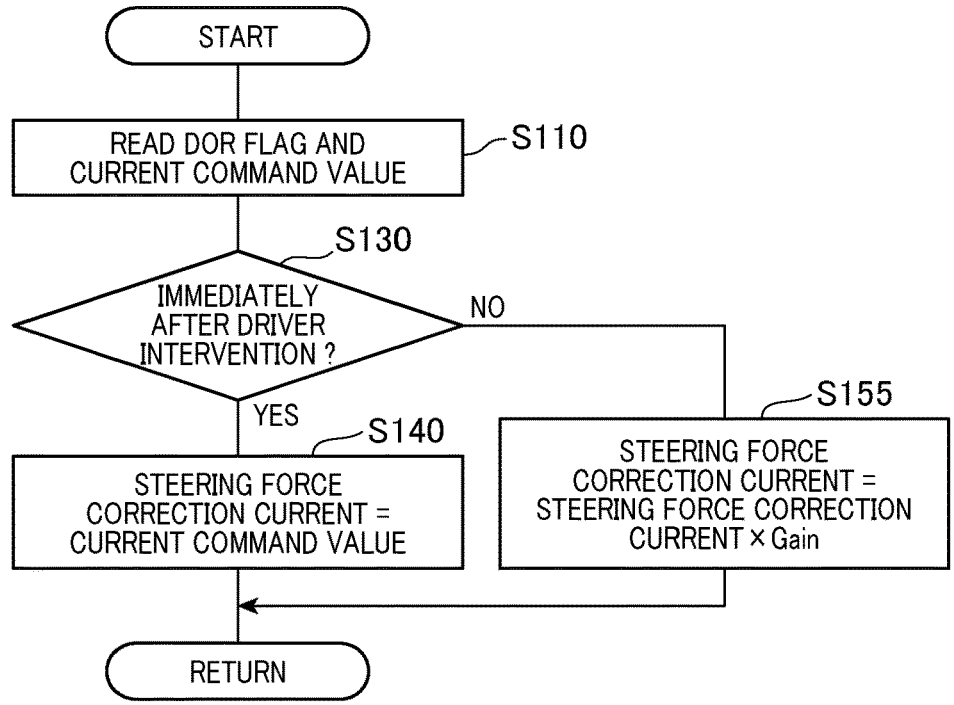
FIG. 9 shows a flowchart of an operation of a steering force correcting unit in a third modification.

However, as shown in FIG. 9, if it is determined in S130 that the present moment is not immediately after the driver intervention, the process may proceed to S155 where the steering force correction current is set by multiplying a predetermined gain to the steering force correction current set immediately after the driver intervention in S140.

In this way, in S140, as the current command value CC being set to a steering force correction current during the driver intervention detection be a reference value, a current value larger or smaller than the reference value can be set as the steering force correction current (in other words, correction current value RC).

That is, if the gain multiplied by the reference value of the steering force correction current in S155 is set to a value smaller than 1 (Gain<1), the steering reaction force becomes larger when the steering angle is increased than when the steering angle is decreased.

Conversely, if the gain multiplied by the reference value of the steering force correction current in S155 is set to a value larger than 1 (Gain>1), the steering reaction force becomes smaller when the steering angle is increased than when the steering angle is decreased.

Therefore, according to the third modification, the steering reaction force for the steering operation during the driver intervention becomes adjustable so that a desired difference between when the steering angle is increased and when the steering angle is decreased occurs according to the gain multiplied by the reference value of the steering force correction current.

It should be noted that in this case, since when the gain is set to a value smaller than 1, the steering reaction force becomes larger when the steering angle is increased than when the steering angle is decreased, so it is possible to restrain the driver from feeling discomfort better.

Fourth Modification

Next, if it is determined in S130 that the driver intervention is not immediately after the steering force correcting process presently, the corrected steering force correction current set based on the steering force correction current immediately after the driver intervention is maintained in S150 or S155 in the above embodiment and the first to third modifications.

Figure 10:
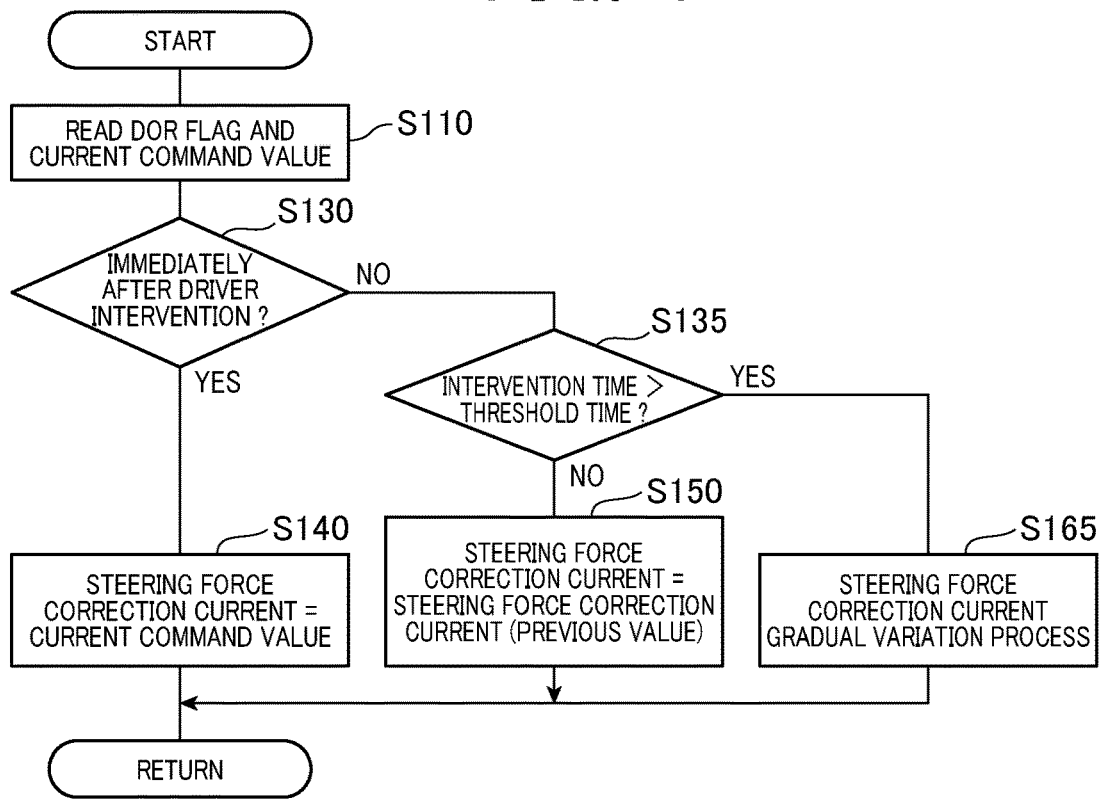
FIG. 10 shows a flowchart of an operation of a steering force correcting unit in a fourth modification.

However, as shown in FIG. 10, the process in S150 or S155 may be executed until the driver intervention time exceeds the predetermined threshold time (YES in S135) only after being determined in S130 that the present moment is not immediately after the driver intervention.

In this case, if it is determined that the driver intervention time exceeds the predetermined threshold time (NO in S135), the steering force correction current is gradually decreased in S165 by multiplying a correction coefficient smaller than the value 1 by a previous value of the steering force correction current, for example.

In this way, since the correction command RC outputted from the steering force correction unit 48 gradually approaches the value 0 during the driver intervention period, the center point (neutral point) of the steering operation moves to the neutral point of the steering angle 0.

As a result, the automatic operation of the vehicle by the tracking process is canceled and it is possible to avoid the driver feeling discomfort when the vehicle is operated manually.

That is, if the correction command RC is not 0 at the start of the manual operation, a difference occurs in the steering reaction force depending on the steering direction from the neutral point of the steering angle 0, so that it is conceived that the driver feels discomfort.

However, according to the fourth modification, such problems can be suppressed from occurring.

It should be noted that when gradually decreasing the steering force correction current in S165, it is not always necessary to use a correction coefficient smaller than the value 1, and for example, a conventional method such as a method to converge the steering force correction current to the value 0 using a low pass filter and the like may be used.

As described above, when the steering force correction current as the correction command RC is gradually decreased during the driver intervention period, the correction coefficient may be set according to the steering operation amount by the driver (in other words, the degree of intervention by the driver), for example.

In this way, it is possible to gradually reduce the steering force correction current according to the degree of intervention of the driver with respect to the tracking process.

Fifth Modification

Next, in the above embodiment and the first to fourth modifications, when it is determined at S130 that the present moment is immediately after the driver intervention, the present current command value CC read at S110 is set as the steering force correction current (or its reference value) in the steering force correcting process at S140.

Figure 11:
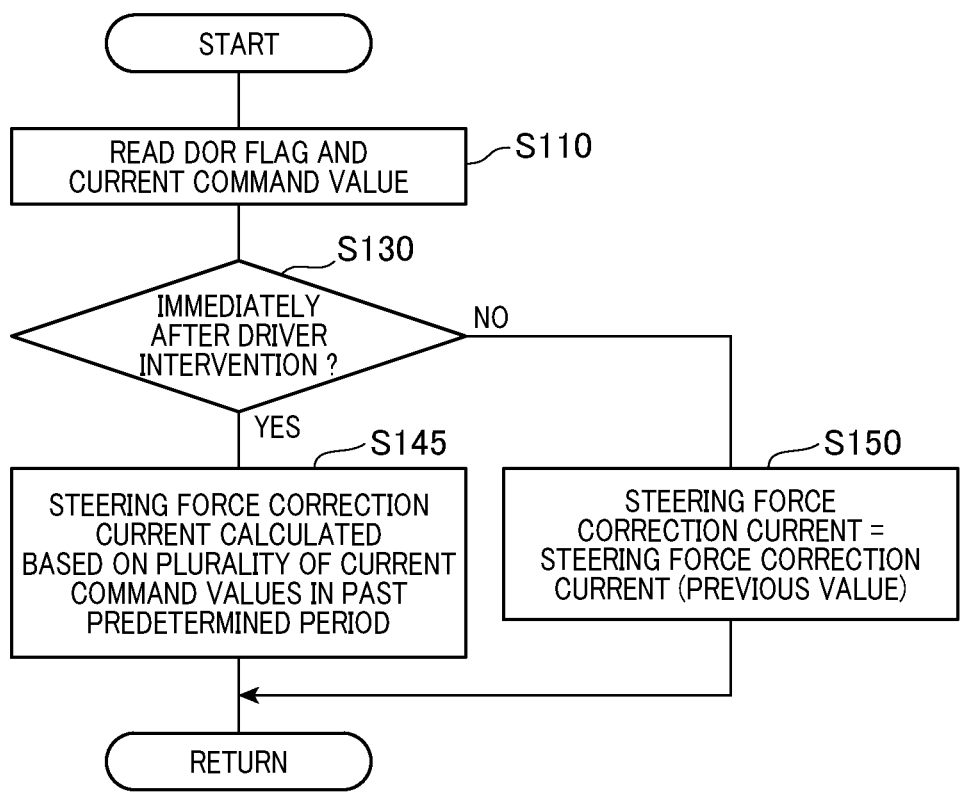
FIG. 11 shows a flowchart of an operation of a steering force correcting unit in a fifth modification.

In contrast to this, in the fifth modification, as shown in FIG. 11, if it is determined that the present moment is immediately after the driver intervention at S130, the process proceeds to S145.

Then, the steering force correction current (or its reference value) is set based on a plurality of current command values CC in a past predetermined period read in S110.

In this way, even when the current command value CC (more specifically, the tracking command TC) is changing at the start of the driver intervention, it becomes possible to set a stable and proper correction current value as the correction command RC.

In this case, an average value of a parameter group including a plurality of current command values CC may be obtained, and the average value thereof may be set as the steering force correction current in S145.

Alternatively, an intermediate value may be selected from the parameter group including the plurality of current command values CC, and an intermediate value thereof may be set as the steering force correction current.

Sixth Modification

Next, it is described in the above embodiment and the first to fifth modifications that the current command value (or a plurality of current command values in a past predetermined period) during the driver intervention detected by the intervention detecting unit 44 CC is used in the steering force correcting unit 48 when setting the correction command RC.

Figure 12:
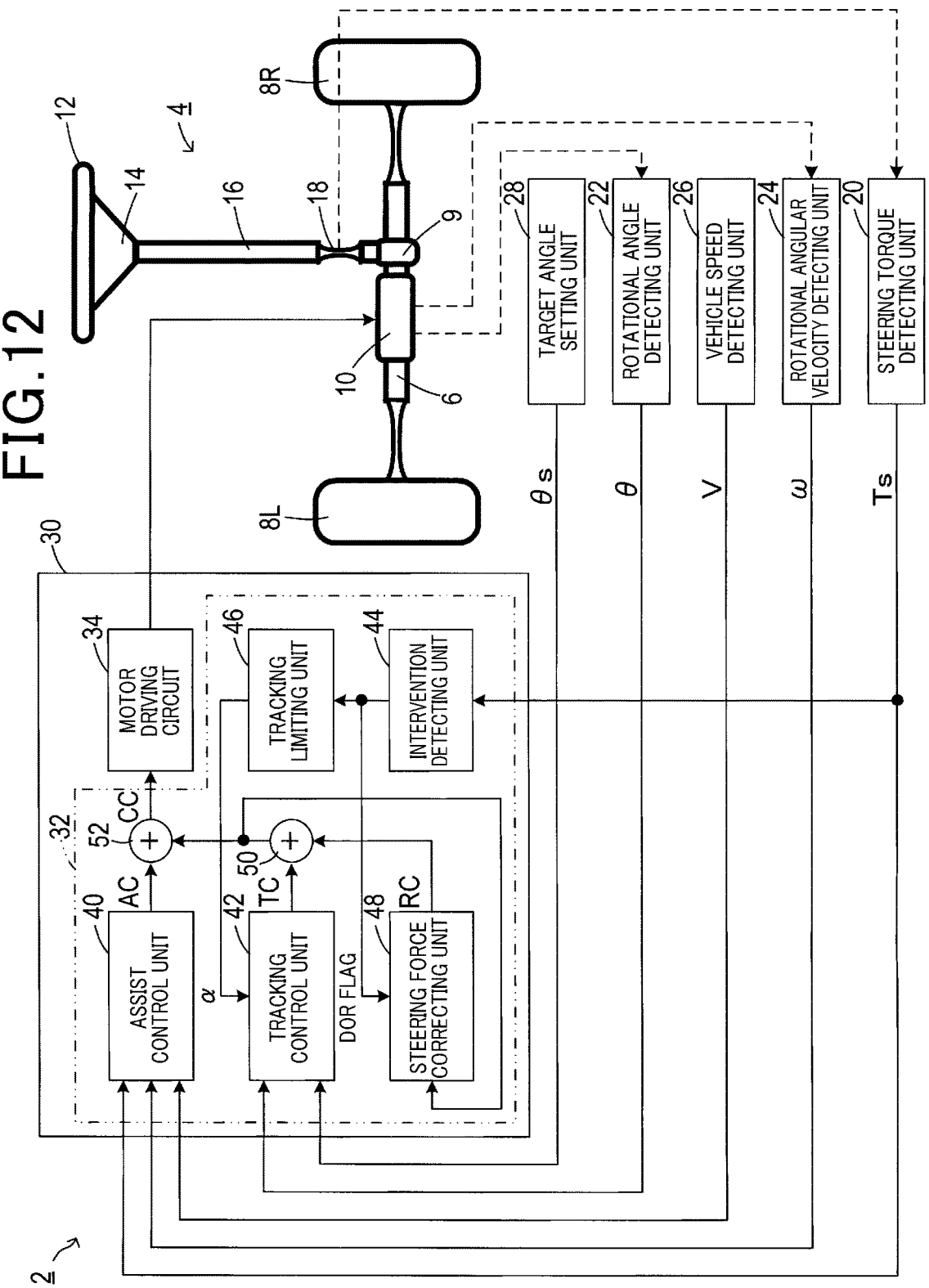
FIG. 12 shows a block diagram of an overall configuration of a driving support device in a sixth modification.

In contrast to this, as shown in FIG. 12, an output (addition value: RC+TC) from the first adding unit 50 when the driver intervention is detected by the intervention detecting unit 44 may be inputted to the steering force correcting unit 48, and the steering force correcting unit 48 may set the correction command RC based on this output.

In other words, the steering force correcting unit 48 may set the correction command RC using the present addition value (RC+TC) calculated by the first adding unit 50, or may set the correction command RC using the plurality of addition values (RC+TC) calculated in a past predetermined period in the first adding unit 50.

Even in this case, since the addition value (or a plurality of addition values within the past predetermined period) when the driver intervention is detected by the intervention detecting unit 44 is a value calculated when the correction command RC=0, it is possible to obtain the same effect as the above embodiment or the first to fifth modifications.

Seventh Modification

Figure 13:
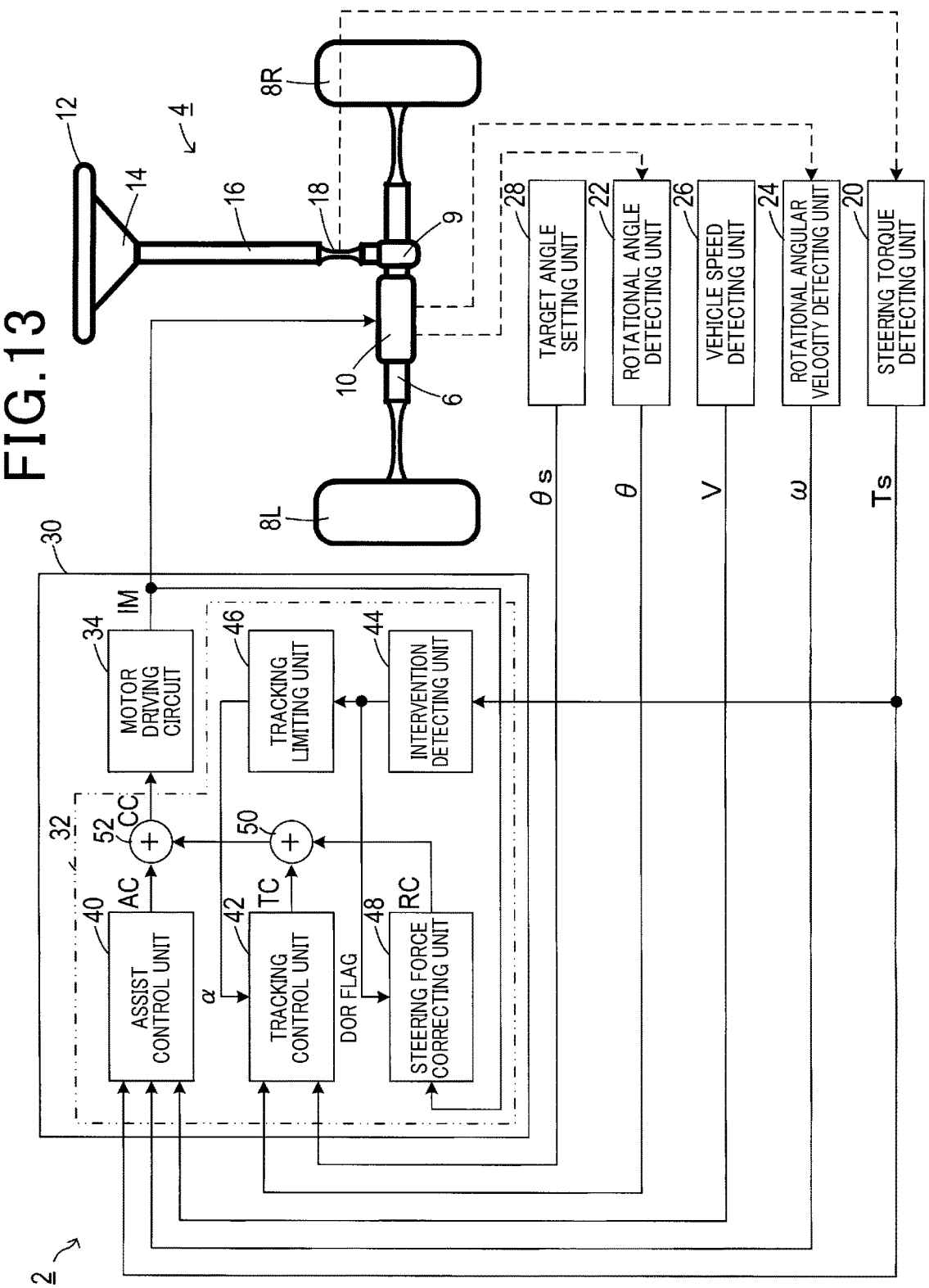
FIG. 13 shows a block diagram of an overall configuration of a driving support device in a seventh modification.

Further, as shown in FIG. 13, by detecting a current value IM flowing from the motor driving circuit 34 to the motor 10 and inputting it to the steering force correcting unit 48, the steering force correcting unit 48 may set the correction current value as the correction command RC based on the current value IM.

In this case, the steering force correcting unit 48 may set the correction command RC by using the current value IM flowing in the motor 10 when the driver intervention is detected, or may set the correction command RC by using a plurality of current values IM detected in the past predetermined period the until the driver intervention is detected.

Even in this case, since the current value IM flowing in the motor 10 corresponds to the current command value CC, it is possible to obtain the same effect as the above embodiment or the first to sixth modifications.

It should be noted that when setting the correction command RC in the steering force correction unit 48, it is not necessary to use one of the above-mentioned parameters (the current command value CC, the addition value (TC+RC), the current value IM), and these parameters may be used in combination.

Eighth Modification

On the other hand, the correction current value as the correction command RC is set based on the current command value CC which is the control output during the driver intervention, or the tracking command TC and current value IM corresponding to the current command value CC in the above embodiment and the first to seventh modifications.

In contrast to this, the correction current value as the correction command RC can also be set based on the target angle θs which is a target value of the tracking process.

That is, the steering angle of the steered wheels 8L, 8R is controlled to a target steering angle corresponding to the target angle θs in the tracking process.

Then, the SAT that causes a difference in the steering reaction force depending on the operation direction during the driver intervention can be described as follows, and the SAT may be estimated if a steering angle δr corresponding to the target angle θs, the vehicle speed V, and a yaw rate γ are known.

$$SAT = Yf(\varepsilon c + \varepsilon n)$$
$$= -Kf \cdot \beta f(\varepsilon c + \varepsilon n)$$
$$= -\varepsilon Kf(\beta + (Lf/V) \cdot Y - \delta r)$$

Here, Yf is a cornering force of the steered wheels, εC is a caster trail, εn is a pneumatic trail, Kf is a cornering power of the steered wheels, βf is a slip angle of a steered wheel tire, β is a slip angle of the vehicle, Lf is a distance between gravity centers of the steered wheels, V is the vehicle speed, γ is the yaw rate, and δr is the steering angle of the steered wheels.

Figure 14:
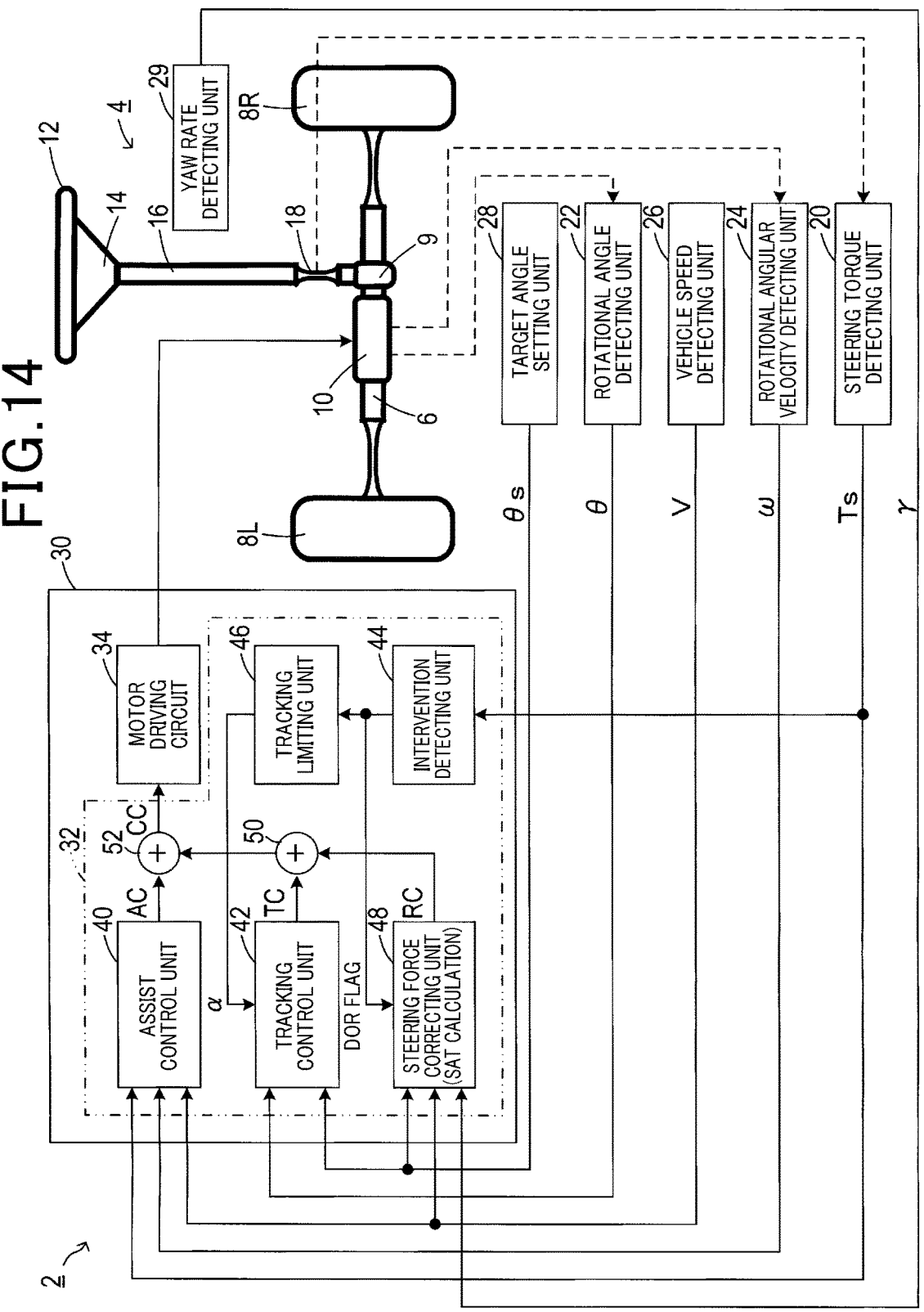
FIG. 14 shows a block diagram of an overall configuration of a driving support device in an eighth modification.

Accordingly, in the eighth modification, a yaw rate detecting unit 29 is provided, and the yaw rate γ detected by the yaw rate detecting unit 29, the target angle θs set in the target angle setting unit 28, and the vehicle speed V detected by the vehicle speed detecting unit 26 are inputted to the steering force correcting unit 48 as shown in FIG. 14.

Then, the steering force correcting unit 48 estimates the SAT by executing a correction command calculation process shown in FIG. 15 instead of the above-mentioned process of S140 immediately after the driver intervention, and sets the correction command RC based on the estimation result.

Specifically, in the correction command calculation process shown in FIG. 15, firstly in S 210, the yaw rate Γ, the target angle θs, and the vehicle speed V are read.

Next, in S220, the target angle θs read in S210 is converted into the steering angle δr, and the SAT is estimated according to the above arithmetic expression based on the steering angle δr, the yaw rate γ, and the vehicle speed V.

Finally, in S230, the correction current value as the correction command RC is calculated from the SAT by multiplying the SAT estimated as described above by a preset conversion constant.

As described above, even if the correction command RC is set by estimating the SAT from the target angle θs which is the target value of the tracking process, it is possible to obtain the same effect as in the above embodiment or the first to seventh modifications.

Other Modifications

In a case where the correction command RC is set based on the SAT as in the eighth modification, the SAT does not necessarily have to be estimated from the target angle θs which is the target value of the tracking process.

The steering angle δr may be obtained from the rotational angle θ of the motor 10 to estimate the SAT, for example.

Further, since various methods have been proposed as estimation methods of SAT, the steering force correction unit 48 may estimate the SAT using the proposed known technique.

For example, a load disturbance observer for estimating a disturbance load corresponding to an SAT is disclosed in Japanese Patent Application Laid-Open Publication No. 2009-96265 (Patent Document 2), and the SAT may be estimated by using this load disturbance observer.

It should be noted that although the load disturbance observer disclosed in Patent Document 2 estimates the disturbance load based on a torsion torque corresponding to the steering torque Ts, the rotational angle θ of the motor 10, and the assist torque, it is necessary to estimate the SAT during the tracking process is performed in the present disclosure.

Therefore, in the load disturbance observer, a torque obtained by adding the automatic steering torque to the assist torque instead of the assist torque may be used to estimate the SAT in the present disclosure.

In addition, it can be considered that no assist torque is generated immediately after the driver intervention in the present disclosure so that the SAT may be estimated by using the automatic steering torque instead of the assist torque in the load disturbance observer.

Next, it is described in the above embodiment that the tracking process is limited by the tracking limiting unit 46 setting the intervention coefficient α during the driver intervention and limiting the upper limit of the tracking command TC generated by the tracking control unit 42 using the intervention coefficient α.

However, the tracking limiting unit 46 only needs to be able to limit the tracking command TC (in other words, the current command value) outputted from the tracking control unit 42 during the driver intervention, and thus the tracking command TC may be reduced by using other methods.

Further, it is described in the above embodiment that the target angle setting unit 28 sets the target angle θs of the rotational angle θ of the motor 10, and the tracking control unit 42 track-controls (so-called feedback control) the target angle θs so that the rotational angle θ of the motor 10 becomes the target angle θs.

However, the tracking process may be controlled using the steering angle and the steering angular velocity obtained by multiplying the rotational angle θ and the rotational angular velocity ω of the motor 10 by a gear ratio of the speed reducer disposed between the motor 10 and the pinion gear so that these parameters to be the target values, for example.

A case where the lane keep control is performed as the tracking process has been described as an example in the above embodiment. However, it is sufficient that the automatic steering torque is generated based on the following: a motor rotational angle, a steering rotational angle, a yaw rate sensor, a deviation between a tire steering angle and a target value, a lateral displacement from a target position obtained by a laser radar, a millimeter wave radar or the like, a deviation to a target trajectory obtained by GPS or the like, and a curvature obtained by a road shape, for example.

Although the intervention by the driver is detected based on the steering torque detected by the steering torque detecting unit 20 in the above embodiment, the intervention detection is not limited thereto, and well-known steering intervention detection (determination) methods may be optionally used.

For example, an intervention of a driver may be detected from a deviation between a target value and a detection value in a target tracking process, or a combination of the deviation and the output of the motor rotational angular velocity or the torque sensor, or the like.

Further, a plurality of functions possessed by a single component in the embodiment or the modifications may be enabled by a plurality of components, or a single function of a single component may be enabled by a plurality of components.

In addition, the plurality of functions of the plurality of components may be enabled by a single component, or a single function enabled by the plurality of components may be enabled by one component.

Further, a part of the configurations of the above embodiment may be omitted.

Furthermore, at least a part of the configuration of the above embodiment may be added to or replaced with the configuration of the other embodiment described above.

It should be noted that all aspects included in the technical concept specified only by the language described in the claims are embodiments of the present invention.

What is claimed is:

1. A driving support device for a vehicle comprising:
an assist control unit, performed by a microcomputer, that generates an assist command for generating an assist torque for reducing a steering load according to a steering torque generated by a driver's steering operation;

a tracking control unit, performed by a microcomputer, that acquires a target value of a physical quantity related to steering of the vehicle and generates a tracking command for generating an automatic steering torque that causes a detected value of the physical quantity to track the target value;

an intervention detecting unit, performed by a microcomputer, that detects that the driver has intervened, by the steering operation, in a tracking process being performed by the tracking control unit;

a tracking limiting unit, performed by a microcomputer, that limits the tracking process so as to enable the steering of the vehicle by the steering operation by the driver in response to the intervention detecting unit detecting that the driver has intervened in the tracking process;

a steering force correcting unit, performed by a microcomputer, that generates a correction command for correcting a steering force so that the difference in the steering reaction force is reduced between a situation where the steering operation by the driver is an steering-increase operation for increasing a steering angle and a situation where the steering operation is a steering-decrease operation for decreasing the steering angle in response to the intervention detecting unit detecting that the driver has intervened in the tracking process; and a motor drive circuit that drives a motor that generates the assist torque and the automatic steering torque based on the assist command, the tracking command, and the correction command.

2. The driving support device for the vehicle according to claim 1, wherein, in response to the intervention by the driver being detected by the intervention detecting unit, the steering force correcting unit is configured to generate the correction command by adding at least one of assist command, the tracking command, the correction command, the tracking command, and a current value flowing through the motor.

3. The driving support device for the vehicle according to claim 1, wherein, the steering force correcting unit is configured to generate the correction command in response to the intervention by the driver being detected by the intervention detecting unit and maintain the correction command thereafter.

4. The driving support device for the vehicle according to claim 1, wherein, the steering force correcting unit is configured to output a command value that does not correct the assist torque and the automatic steering torque as the correction command in response to the intervention by the driver not being detected by the intervention detecting unit.

5. The driving support device for the vehicle according to claim 4, wherein, the steering force correcting unit is configured to smooth the correction command so that the correction command gradually changes to a final value in at least one of the following situations, the first situation being that in response to the detection result by the intervention detecting unit being switched from the intervention to the non-intervention, and the second situation being that in response to the detection result being switched from the non-intervention to the intervention.

6. The driving support device for the vehicle according to claim 5, wherein, the steering force correcting unit is configured to smooth the correction command at both situations in response to the detection result of the intervention detecting unit being switched from the intervention to the non-intervention and in response to the detection result being switched from the non-intervention to the intervention; and the steering force correcting unit is configured to smooth the correction command so that the degree of smoothing becomes larger in response to the detection result being switched from the intervention to the non-intervention than in response to the detection result being switched from the non-intervention to the intervention.

7. The driving support device for the vehicle according to claim 5, wherein, the steering force correcting unit is configured to smooth the correction command in response to the detection result of the intervention detecting unit being switched from the intervention to the non-intervention; and the steering force correcting unit is configured not to smooth the correction command in response to the detection result of the intervention detecting unit being switched from the non-intervention to the intervention.

8. The driving support device for the vehicle according to claim 5, wherein, a smoothing frequency in response to the steering force correcting unit smoothing the correction command in response to the detection result of the intervention detecting unit being switched from the intervention to the non-intervention is set lower than a response frequency of the tracking process by the tracking control unit.

9. The driving support device for the vehicle according to claim 5, wherein, a smoothing frequency in response to the steering force correcting unit smoothing the correction command in response to the detection result of the intervention detecting unit being switched from the non-intervention to the intervention is set higher than a response frequency of the tracking process by the tracking control unit.

10. The driving support device for the vehicle according to claim 1, wherein, the steering force correcting unit is configured to obtain a reference value of the correction command in response to the intervention by the driver being detected by the intervention detecting unit, and is configured to generate the correction command based on the reference value.

11. The driving support device for the vehicle according to claim 1, wherein, the steering force correcting unit is configured to change the correction command gradually to a command value that does not correct the assist torque nor the automatic steering torque according to an intervention time or an intervention degree during an intervention period in response to the intervention by the driver being detected by the intervention detecting unit.

12. The driving support device for the vehicle according to claim 1, wherein, the steering force correcting unit is configured to generate the correction command by using at least one of parameter groups, the parameter groups include a plurality of the addition values, a plurality of the tracking commands, and a plurality of current values flowing to the motor obtained in a past predetermined period from a time in response to the intervention by the driver being detected by the intervention detecting unit.

13. The driving support device for the vehicle according to claim 1, wherein,
the steering force correcting unit is configured to generate the correction command by using at least the target value of the tracking process.

14. The driving support device for the vehicle according to claim 1, wherein,
the steering force correcting unit is configured to estimate a self-aligning torque applied from wheels, and is configured to generate the correction command using the self-aligning torque.

15. The driving support device for the vehicle according to claim 1, wherein,
the physical quantity related to the steering of the vehicle is an angle.

16. The driving support device for the vehicle according to claim 1, the driver support device operates at least in switching between automatic steering and driver intervention steering.

17. A vehicle driving support method comprising steps of:
generating an assist command for generating an assist torque for reducing a steering load according to a steering torque generated by a driver's steering operation;
acquiring a target value of a physical quantity related to steering of the vehicle and generating a tracking command for generating an automatic steering torque that causes a detected value of the physical quantity to track the target value;
detecting that the driver has intervened in a tracking process by the tracking control unit by the steering operation;
limiting the tracking process so as to enable the steering of the vehicle by the steering operation by the driver in response to the intervention detecting unit detecting that the driver has intervened in the tracking process;
generating a correction command for correcting a steering force so that the difference in the steering reaction force is reduced between a situation where the steering operation by the driver is an steering-increase operation for increasing a steering angle and a situation where the steering operation is a steering-decrease operation for decreasing the steering angle in response to the intervention detecting unit detecting that the driver has intervened in the tracking process; and
driving a motor that generates the assist torque and the automatic steering torque based on the assist command, the tracking command, and the correction command.

18. The vehicle driving support method according to claim 17, wherein,
the physical quantity related to the steering of the vehicle is an angle.

* * * * *